United States Patent
Subramaniam et al.

(10) Patent No.: US 10,746,186 B2
(45) Date of Patent: Aug. 18, 2020

(54) HVAC BLOWER PROTECTION

(71) Applicant: Lennox Industries Inc., Richardson, TX (US)

(72) Inventors: Palanivel Subramaniam, Richardson, TX (US); Austin Clay Styer, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 14 days.

(21) Appl. No.: 15/669,504

(22) Filed: Aug. 4, 2017

(65) Prior Publication Data

US 2019/0040868 A1    Feb. 7, 2019

(51) Int. Cl.
| | |
|---|---|
| *F04D 27/00* | (2006.01) |
| *H02H 9/02* | (2006.01) |
| *H02P 29/00* | (2016.01) |
| *F24F 11/00* | (2018.01) |
| *H02H 9/00* | (2006.01) |

(52) U.S. Cl.
CPC ............ *F04D 27/008* (2013.01); *F24F 11/00* (2013.01); *H02H 9/001* (2013.01); *H02H 9/02* (2013.01); *H02P 29/00* (2013.01)

(58) Field of Classification Search
CPC .................................................. F04D 27/008
USPC .............. 318/788, 400.08, 792, 641, 400.21, 318/400.22, 783; 361/23
See application file for complete search history.

(56) References Cited

U.S. PATENT DOCUMENTS

| | | | | | |
|---|---|---|---|---|---|
| 4,334,255 | A | * | 6/1982 | Izumi | B60H 1/3225 |
| | | | | | 123/198 R |
| 4,375,587 | A | * | 3/1983 | Perl | H05B 6/666 |
| | | | | | 219/721 |
| 4,587,590 | A | * | 5/1986 | Bala | G06F 11/0796 |
| | | | | | 361/94 |
| 4,894,745 | A | * | 1/1990 | Akagawa | B60L 3/0069 |
| | | | | | 361/33 |

(Continued)

FOREIGN PATENT DOCUMENTS

| | | |
|---|---|---|
| CN | 2811968 Y | 8/2006 |
| CN | 204590731 U | 8/2015 |

(Continued)

OTHER PUBLICATIONS

European Patent Office, Extended European Search Report, Application No. 18186869.6, dated Dec. 3, 2018, 9 pages.

(Continued)

*Primary Examiner* — Jorge L Carrasquillo
(74) *Attorney, Agent, or Firm* — Baker Botts L.L.P.

(57) ABSTRACT

An apparatus includes a blower drive and a protection circuit. The blower drive includes a processor and a capacitor. The capacitor is electrically coupled to the processor and provides electrical power to the processor during a short circuit in the blower drive. The protection circuit is electrically coupled to the blower drive and includes a first switch, a positive temperature coefficient resistor, and a second switch. The positive temperature coefficient resistor is electrically coupled in series to the first switch. The second switch is electrically coupled in parallel to the positive temperature coefficient resistor and opens during the short circuit in the blower drive. The first switch opens after the second switch opens and after a short circuit current is below a threshold.

18 Claims, 6 Drawing Sheets

(56) References Cited

U.S. PATENT DOCUMENTS

| | | | | |
|---|---|---|---|---|
| 5,805,393 A * | 9/1998 | Thomas | ............... | H02H 9/026 361/13 |
| 5,995,392 A * | 11/1999 | Turner | ................ | H02H 9/001 323/908 |
| 2010/0066177 A1* | 3/2010 | Ishikawa | ................ | G05F 1/14 307/130 |
| 2017/0222572 A1* | 8/2017 | Yamakawa | ............ | H02M 1/08 |
| 2018/0034361 A1* | 2/2018 | Shizu | ..................... | F24F 11/89 |

FOREIGN PATENT DOCUMENTS

| | | | | |
|---|---|---|---|---|
| EP | 0850486 A1 | 7/1998 | | |
| EP | 2795756 A1 | 10/2014 | | |
| EP | 2795756 B1 * | 3/2017 | ............ | H01H 9/42 |

OTHER PUBLICATIONS

Wu, J. et al., "What the Designer Should Know Introduction to Automotive Linear Voltage Regulators", XP055641270, 85579 Neubiberg, Germany, Jul. 1, 2014, pp. 1-32.
European Patent Office, Communication pursuant to Article 94(3) EPC, Application No. 18186869.6, dated Nov. 20, 2019, 8 pages.

* cited by examiner

HVAC BLOWER PROTECTION

TECHNICAL FIELD

This disclosure relates generally to heating, venting, and air conditioning (HVAC).

BACKGROUND

HVAC systems are used to heat and cool spaces, such as residential dwellings or commercial buildings. These HVAC systems may include blowers that move air within and throughout the system.

SUMMARY OF THE DISCLOSURE

According to an embodiment, an apparatus includes a blower drive and a protection circuit. The blower drive includes a processor and a capacitor. The capacitor is electrically coupled to the processor and provides electrical power to the processor during a short circuit in the blower drive. The protection circuit is electrically coupled to the blower drive and includes a first switch, a positive temperature coefficient resistor, and a second switch. The positive temperature coefficient resistor is electrically coupled in series to the first switch. The second switch is electrically coupled in parallel to the positive temperature coefficient resistor and opens during the short circuit in the blower drive. The first switch opens after the second switch opens and after a short circuit current is below a threshold.

According to another embodiment, a method includes providing electrical to a blower through a first switch and a second switch and detecting a short circuit in the blower. In response to detecting the short circuit, the method includes opening the second switch, opening the first switch after the second switch opens and after a short circuit current is below a threshold, and providing, through a capacitor, electrical power to a processor of the blower during the short circuit.

According to yet another embodiment, an HVAC system includes a blower and a protection circuit. The blower moves air and includes a processor and a capacitor. The capacitor is electrically coupled to the processor and provides electrical power to the processor during a short circuit in the blower. The protection circuit is electrically coupled to the blower and includes a first switch, a positive temperature coefficient resistor, and a second switch. The positive temperature coefficient resistor is electrically coupled in series to the first switch. The second switch is electrically coupled in parallel to the positive temperature coefficient resistor and opens during the short circuit in the blower. The first switch opens after the second switch opens and after a short circuit current is below a threshold.

Certain embodiments provide one or more technical advantages. For example, an embodiment protects components (e.g., from damage, overheating, fire, and/or explosion) of a blower during an electrical short circuit. As another example, an embodiment allows the causes of an electrical short circuit to be recorded and assessed. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Heating, venting and air conditioning (HVAC) systems are used to heat and cool spaces such as residential dwellings or commercial buildings by circulating heated or cooled air throughout those spaces. The systems are typically controlled based on the season. For example, during the summer the air conditioning portion of the system is active. During the winter the heating portion of the system is active.

HVAC systems may include blowers that move heated or cooled air within and throughout the HVAC system. A blower may use a motor to turn blades, paddles, or other components to move or cycle air. The air is heated or cooled by the system and the blower moves the heated or cooled air throughout the dwelling. In certain instances, a blower operates in conditions where electrically conductive materials may come in contact with unprotected parts of electrical circuits in the blower, such as through holes or terminals. When this happens, a short circuit may occur in the blower. Short circuits can cause a thermal event in the blower that results in damage to the blower (e.g., overheating, fires, explosions, etc.). Sometimes, the cause of such an event may clear by itself, but other times, entire circuits in the blower may need to be replaced. Additionally, in many short circuit events, there is no record or indication of what caused the short circuit to occur, thus making it more difficult to diagnose and remedy the root problem.

Figure 1:
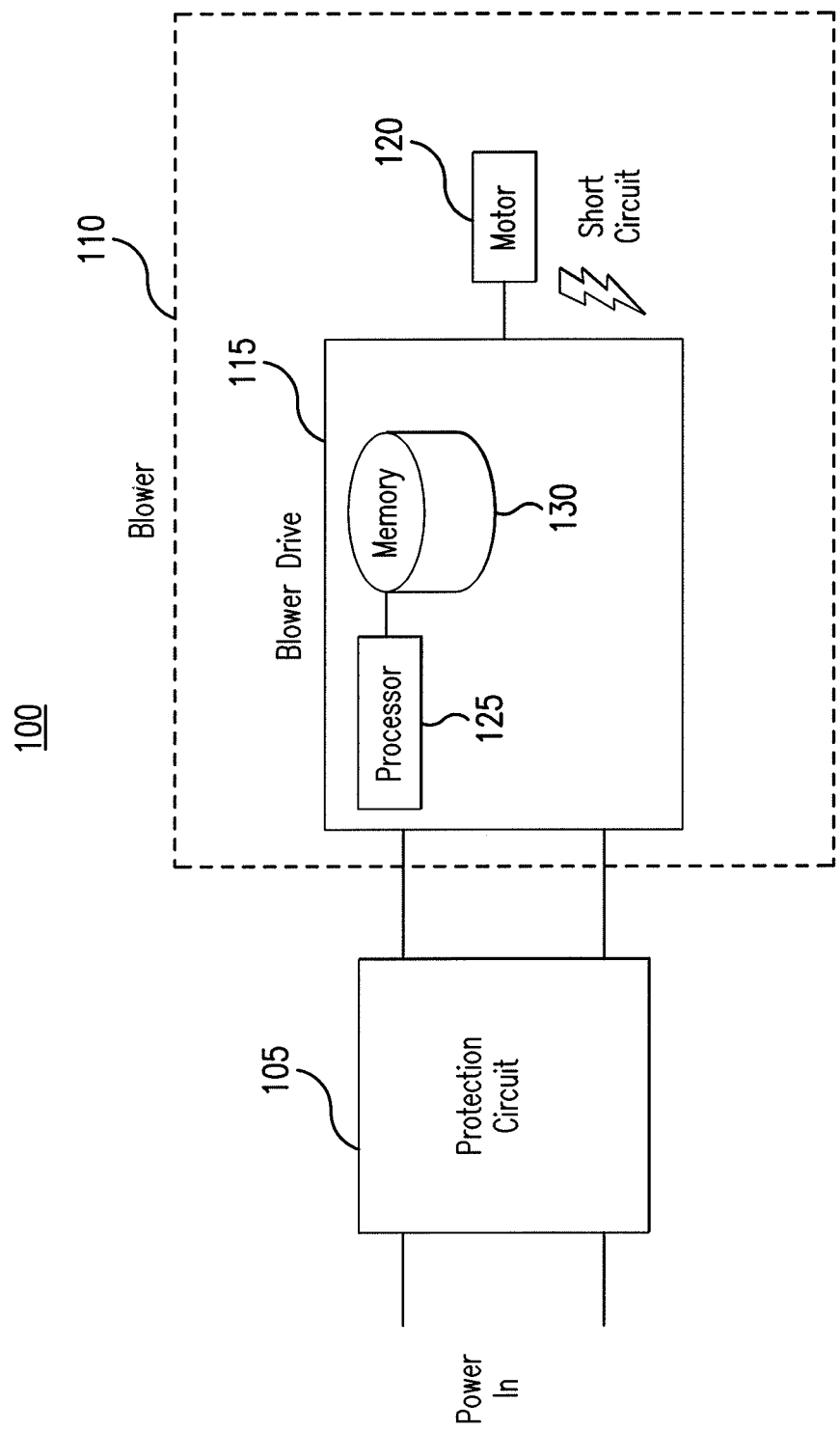
FIG. 1 illustrates components of an HVAC system.

This disclosure contemplates an improved HVAC system that includes a protection circuit that protects the blower during short circuits by limiting and/or lowering the short circuit current to safe levels in certain embodiments. Additionally, the HVAC system includes a capacitor that powers a processor of the blower during the short circuit so that the processor has enough time to record information that can indicate the cause of the short circuit in certain embodiments. In this manner, even if a short circuit occurs, the blower can be protected and the root cause of the short circuit can be diagnosed and remedied. The HVAC system will be described using FIGS. 1 through 5. FIG. 1 will describe the HVAC system generally. FIGS. 2 through 5 will describe the HVAC system in more detail.

FIG. 1 illustrates components of an HVAC system 100. As illustrated in FIG. 1, system 100 includes a protection circuit 105 and a blower 110. One of ordinary skill in the art would understand system 100 to include other unillustrated components such as a high side heat exchanger, a compressor, a load, one or more sensors (e.g., temperature, pressure, etc.), and/or a heater for example. These components have not been illustrated in FIG. 1 to improve the clarity of FIG. 1 although they would be understood to be parts of system 100. In certain embodiments, system 100 improves the operation of blower 110 by protecting blower 110 from short circuits using protection circuit 105.

Protection circuit 105 may be electrically coupled to blower 110. Generally, protection circuit 105 receives electrical power and transmits that electrical power to blower 110. For example, protection circuit 105 may receive alternating current (AC) power. Protection circuit 105 may then transform that AC power into direct current (DC) power. Protection circuit 105 may then transmit that DC power to blower 110.

Blower 110 operates to move air through system 100. Blower 110 includes a blower drive 115 and a motor 120. Generally, blower drive 115 controls the operation of motor 120. For example, blower drive 115 sets a speed and/or torque of motor 120. Motor 120 may turn blades, plates, fins, and/or other components to move and/or circulate air through system 100. Other components of system 100 may heat or cool air. Blower 110 may then move and/or circulate the heated or cooled air through a space such as a building to cool and/or heat the space.

Blower drive 115 includes a processor 125 and a memory 130. This disclosure contemplates processor 125 and memory 130 being configured to perform any of the functions of blower drive 115 and/or blower 110.

Processor 125 is any electronic circuitry, including, but not limited to microprocessors, application specific integrated circuits (ASIC), application specific instruction set processor (ASIP), and/or state machines, that communicatively couples to memory 130 and controls the operation of blower drive 115. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of blower drive 115 by processing information received from other components of HVAC system 100. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

In many instances, blower 110 operates in conditions in which electrically conductive materials may come in contact with unprotected parts of blower 110, which results in an electrical short circuit. For example, bugs, metal dust, or loose electrical components may come in contact with other electrical components in blower 110. This contact may create an electrical bridge that causes a short circuit in blower 110. When short circuits occur, the electrical current drawn by blower 110 increases significantly and nearly instantaneously. This dramatic and sudden increase in electrical current may cause certain components of blower 110 to be damaged such as, for example, by overheating, catching on fire, and/or exploding. Additionally, when the short circuit occurs, voltage supplied to components of blower 110, such as processor 125, may drop very suddenly to near zero. As a result of the power loss, processor 125 may be unable to capture or log various details of blower 110 that may indicate the cause of the short circuit. As a result, it may be difficult if not impossible to diagnose and/or remedy the root cause of certain short circuits in blower 110.

Protection circuit 105 operates to protect blower 110 and components of blower 110 from the sudden current increase caused by a short circuit. Protection circuit 105 limits and/or prevents the short circuit current from reaching potentially catastrophic levels. Additionally, in some embodiments blower drive 115 includes a capacitor coupled to processor 125. The capacitor provides electrical power to processor 125 during a short circuit. The capacitor provides enough electrical power to processor 125 so that processor 125 has enough time to record or log details about blower 110 that may indicate the cause of the short circuit. In this manner, system 100 improves the operation of blower 110 by protecting it from the effects of a short circuit.

Figure 2A:
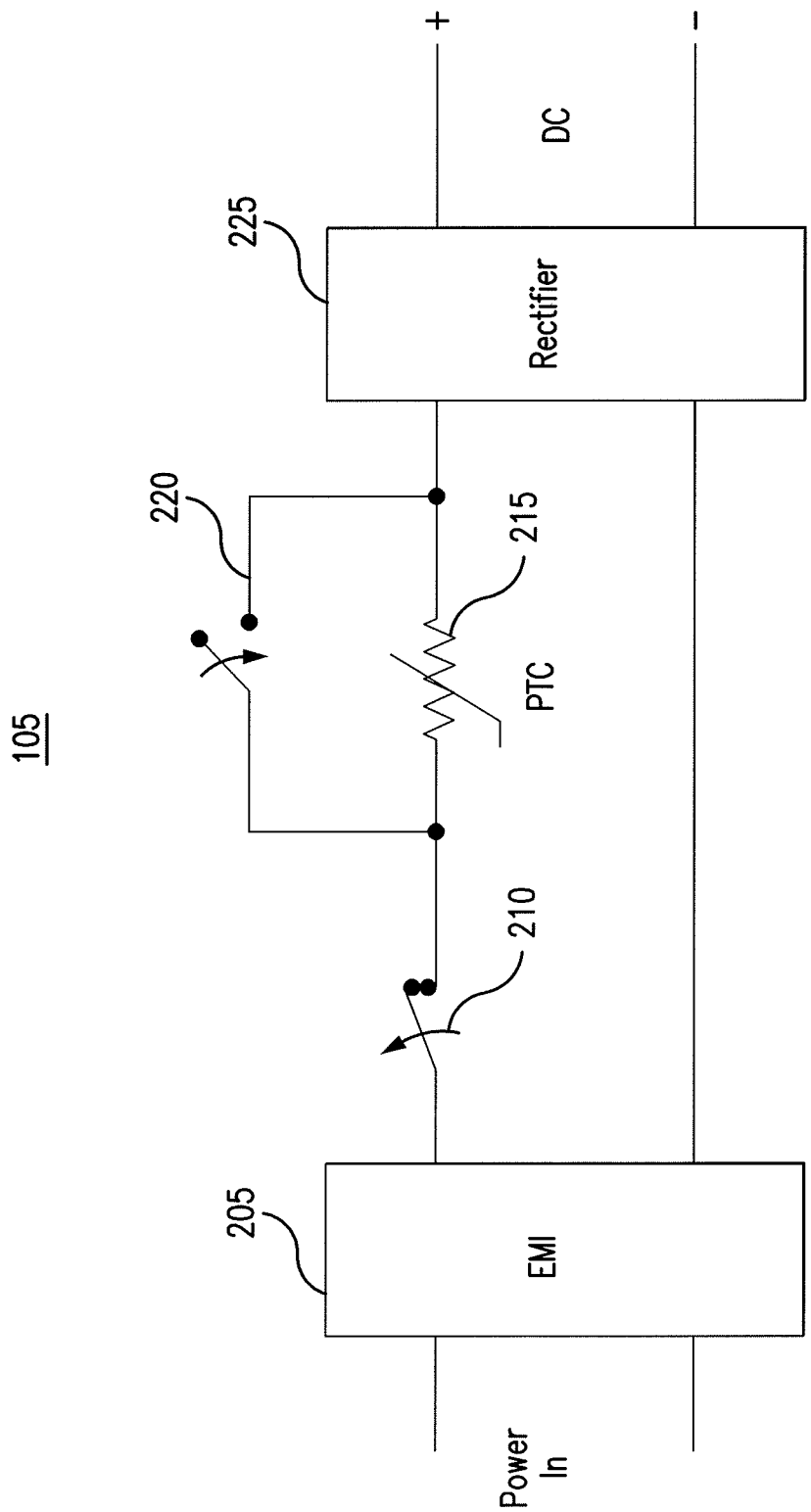
FIG. 2A illustrates a protection circuit of the HVAC system of FIG. 1.

FIG. 2A illustrates a protection circuit 105 of the HVAC system 100 of FIG. 1. As illustrated in FIG. 2A, protection circuit 105 includes electromagnetic interference (EMI) filter 205, a switch 210, a positive temperature coefficient (PTC) resistor 215, a switch 220, and a rectifier 225. Switch 220 is connected in series with switch 210 and in parallel with PTC resistor 215. PTC resistor 215 is connected in series with switch 210. Generally, protection circuit 105 functions to protect a blower or a blower drive from sudden spikes in current. Additionally, protection circuit 105 protects blowers and blower drives from short circuit events.

Protection circuit 105 receives electric power such as alternating current (AC) power. EMI filter 205 first receives the electrical power. EMI filter 205 filters and/or suppresses conducted interference that is present in protection circuit 105 and/or the blower or blower drive. In other words, EMI filter 205 may make protection circuit 105, a blower, and/or a blower drive, more resistant and/or immune to electromagnetic interference signals present in the environment. These signals may be generated, for example, by light fixtures and/or other appliances.

Switch 210 and switch 220 open and close to deliver electrical power to a blower or a blower drive. When both switch 210 and switch 220 are closed, electrical power flows through both switches 210 and 220 to rectifier 225. During a short circuit event or when the system experiences a sudden current spike, switch 220 opens so that electrical power flows through switch 210 and PTC resistor 215 to rectifier 225. In this manner, the PTC resistor 215 may be allowed to control and/or reduce the impact of the short circuit or the sudden current spike.

PTC resistor 215 is a variable resistance resistor. The resistance of PTC resistor 215 changes based on the temperature of PTC resistor 215. As the temperature of PTC resistor 215 increases, so does the resistance of PTC resistor 215. Thus, during a short circuit event or a sudden current spike, the temperature of PTC resistor 215 is expected to increase due to the increased current flowing through PTC resistor 215. As PTC resistor 215 gets hotter, its resistance increases which limits and/or reduces the current. In this manner, PTC resistor 215 limits and/or reduces the current flowing through the system during a short circuit event or a sudden current spike. As a result, the HVAC system may be protected from overheating, damage, and/or explosions.

Rectifier 225 converts an alternating current into a direct current. The direct current may be transmitted to a blower or a blower drive to electrically power the blower or blower drive. This disclosure contemplates rectifier 225 being any electrical component that converts AC to DC. For example, rectifier 225 may include a diode network that allows current to flow in only one direction through rectifier 225.

In operation, protection circuit 105 protects a blower or blower drive during power on (also referred to as startup) and short circuit events. Switches 210 and 220 may begin in the open state. Switch 210 may first close to complete an electrical circuit through protection circuit 105 to initiate the startup process. During startup, the system may experience a sudden spike in current as the various components of the system begin to draw current. When switch 210 is closed and switch 220 is open during startup, the PTC resistor 215 acts to limit the sudden spike in current. Thus, protection circuit 105 protects the blower and blower drive during startup by limiting the startup current. In particular embodiments, limiting the startup current reduces the chances of electrical damage and/or arcing. After the startup current stabilizes and/or falls below a particular threshold, switch 220 may close to complete an electrical circuit through switch 210 and switch 220. After switch 220 is closed, PTC resistor 215 is effectively removed from the electrical circuit.

When a short circuit is determined to be occurring in the system, switch 220 may open so that electrical current flows through switch 210 and PTC resistor 215. The short circuit may result in an increased amount of current flowing through the system. PTC resistor 215 gets hotter as it passes more current. As PTC resistor 215 gets hotter, its resistance increases, thus reducing the amount of current flowing through the system. In this manner, protection circuit 105 protects the system from damage, overheating, and/or explosion during a short circuit event. This disclosure contemplates the short circuit event being detected in any appropriate manner. For example, a voltage sensor can sense the voltage across the DC line from rectifier 225. When the voltage across the DC line goes to zero or substantially zero, the voltage sensor may detect that a short circuit is occurring. As another example, a voltage sensor may monitor the voltage across the DC line and the magnitude of the voltage across the AC line going into EMI filter 205. If the voltage in the DC line drops to zero or substantially zero and the voltage across the AC line is non-zero, then the voltage sensor may determine that a short circuit is occurring.

After the short circuit event ends, the current draw may decrease and eventually approach zero. When that current is determined to be below a threshold (e.g., by a current sensor), switch 210 may open, thus cutting power to the system and isolating the short circuit.

Figure 2B:
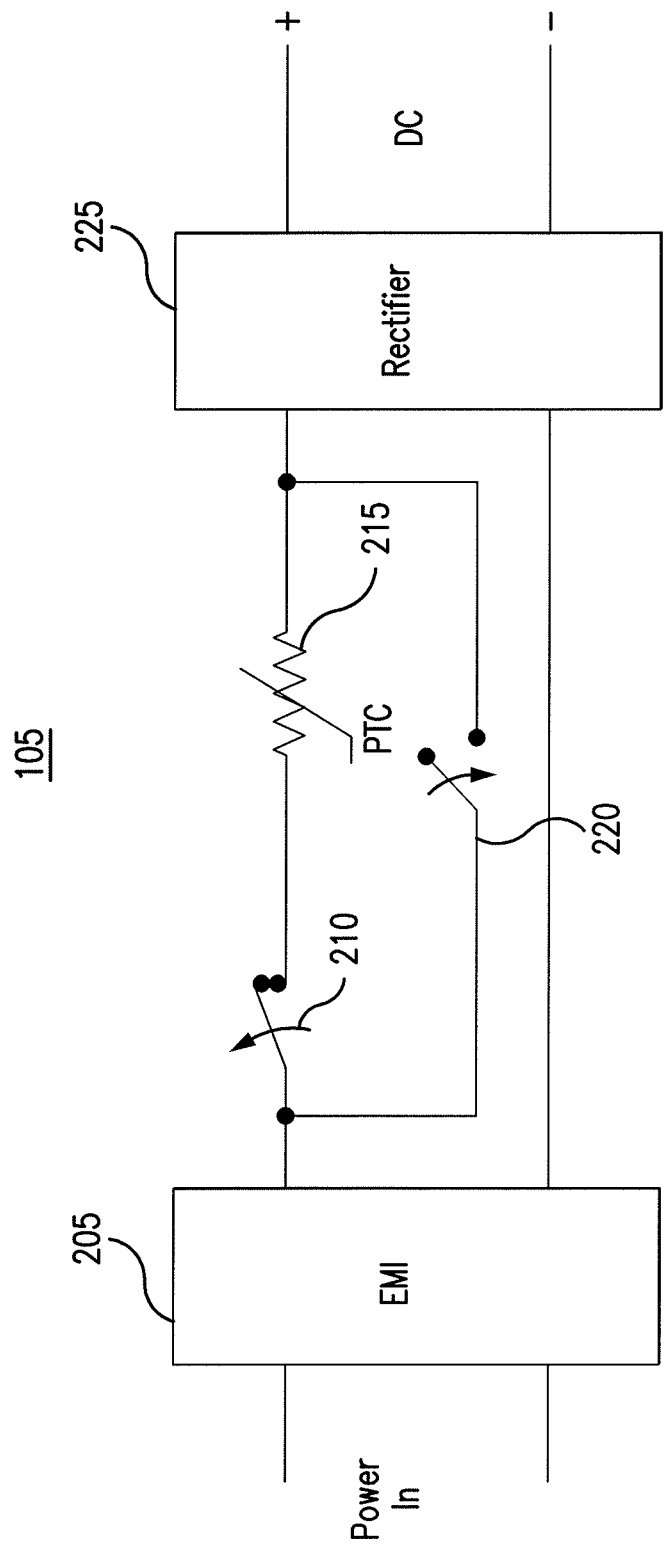
FIG. 2B illustrates a protection circuit of the HVAC system of FIG. 1.

FIG. 2B illustrates an alternative configuration for protection circuit 105 of the HVAC system 100 of FIG. 1. As illustrated in FIG. 2B, switch 220 is arranged in parallel with both switch 210 and PTC resistor 215. In FIG. 2A, switch 220 is arranged in series with switch 210 and in parallel with PTC resistor 215. The operation of protection circuit 105 illustrated in FIG. 2B is similar to the operation of protection circuit 105 illustrated in FIG. 2A. For example, in the circuit of FIG. 2B, switch 210 closes to begin delivering power to the system. PTC resistor 215 limits the startup current. When the startup current stabilizes or falls below a particular threshold, switch 220 closes. In the example of FIG. 2B, when switch 220 is closed electrical power flows through switch 220 to the rest of the system.

During a short circuit event, switch 220 may open so that the short circuit current is sent through switch 210 and PTC resistor 215. PTC resistor 215 gets hotter and its resistance increases thus limiting the short circuit current. When the short circuit current falls below a threshold, switch 210 opens to cut off electrical power from the rest of the system.

Figure 3:
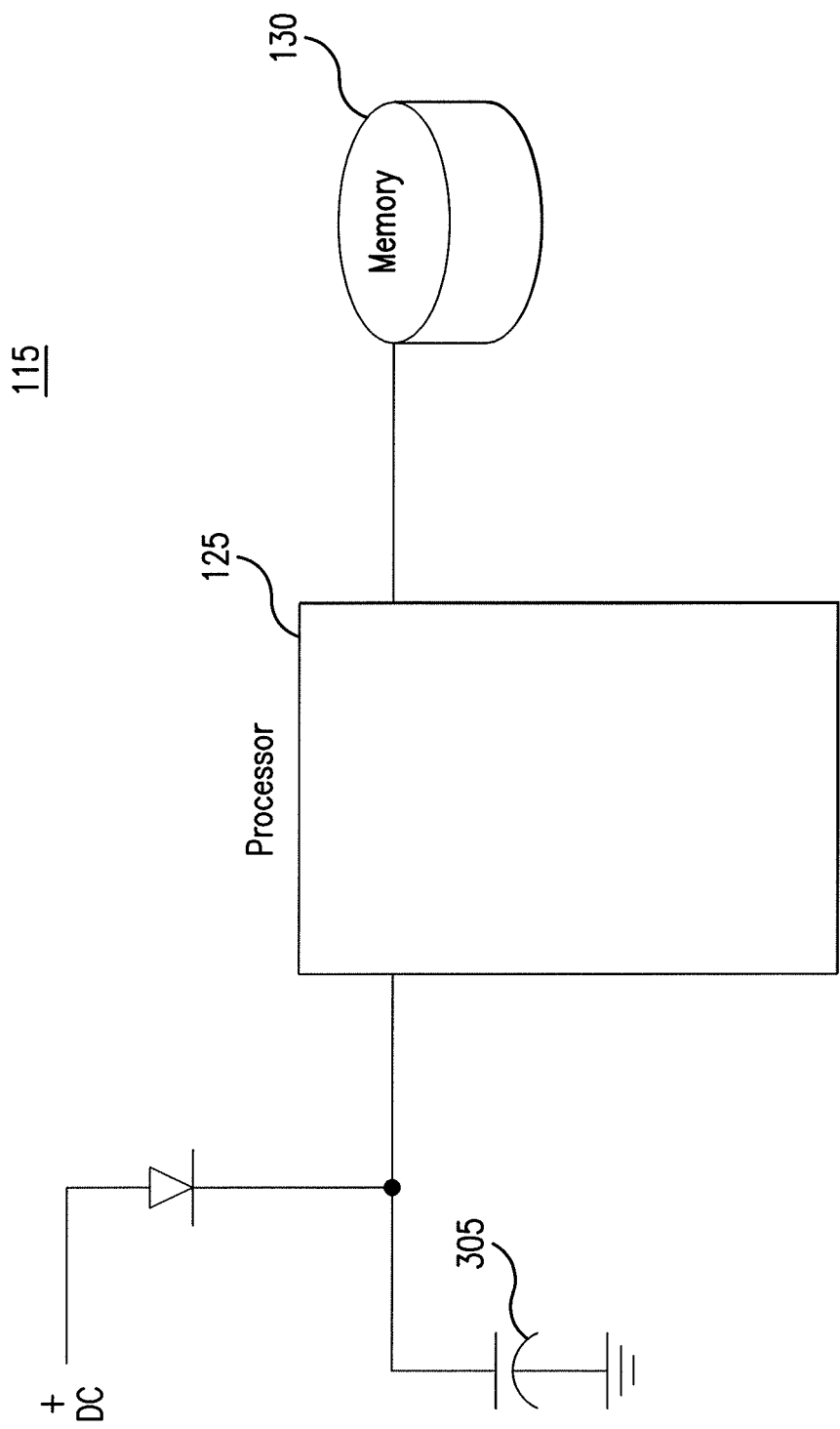
FIG. 3 illustrates a blower drive of the HVAC system of FIG. 1.

FIG. 3 illustrates a blower drive 115 of the HVAC system 100 of FIG. 1. As illustrated in FIG. 3, blower drive 115 includes a processor 125, a memory 130, and a capacitor 305. In particular embodiments, capacitor 305 provides electrical power to processor 125 during a short circuit event.

During a short circuit event, the DC power supplied to processor 125 suddenly drops to zero or near zero. As a result, processor 125 does not have sufficient electrical power to continue functioning. Thus, processor 125 is not provided time to record or log various information about the system so that the cause of the short circuit may be diagnosed. As a result, when short circuits occur in the system, the cause of those short circuits may remain unknown and unrepaired.

Capacitor 305 is configured to provide enough electrical power to processor 125 during a short circuit event. When the DC power being supplied to processor 125 drops to zero, processor 125 begins drawing electrical power from capacitor 305. As that power is drawn from capacitor 305, its voltage drops. Before the voltage supplied by capacitor 305 drops below a threshold under which processor 125 can no longer function, processor 125 logs and records various information about the system so that a cause of the short circuit event may be diagnosed and repaired.

Figure 4:
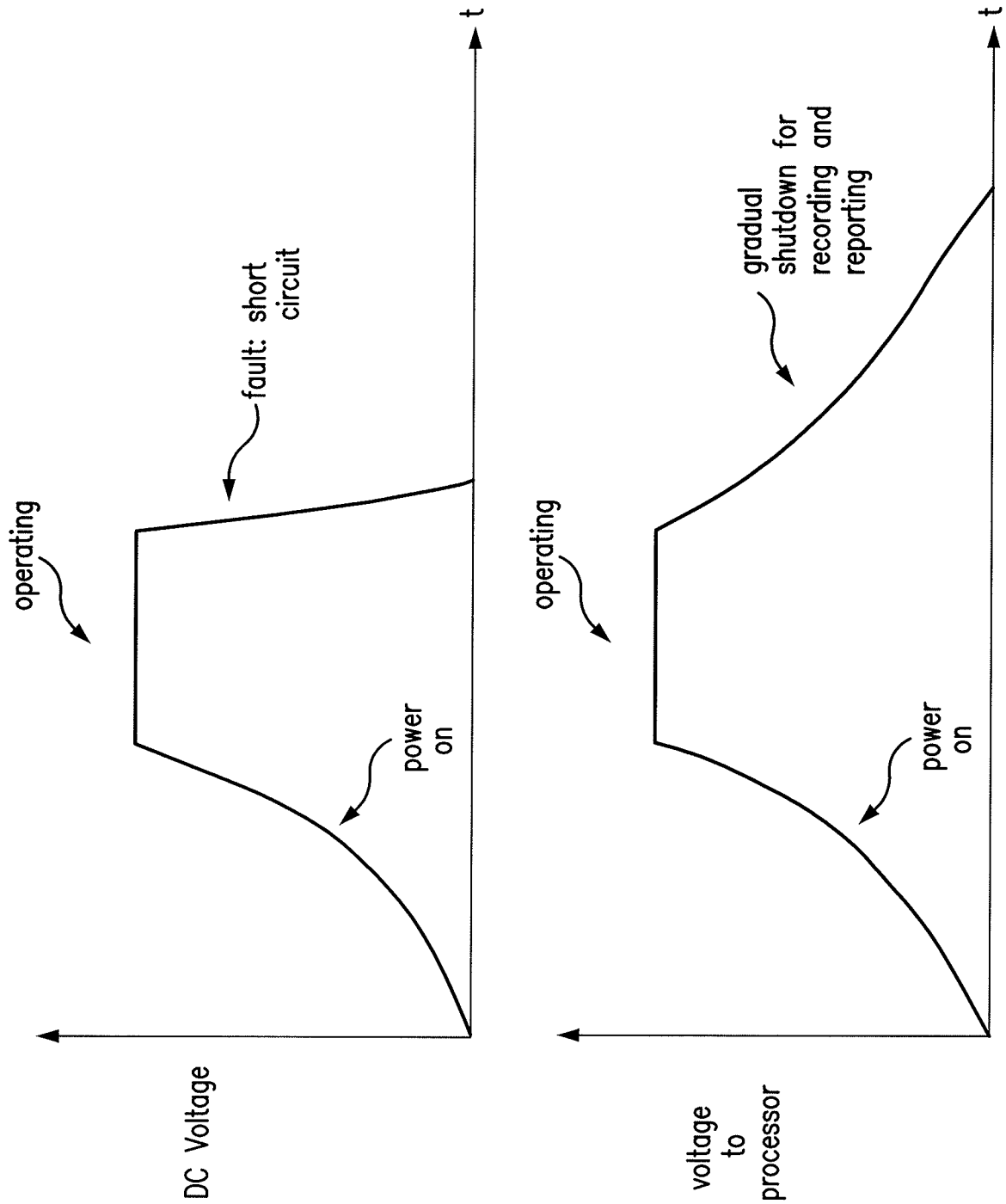
FIG. 4 illustrates voltages in the HVAC system of FIG. 1.

FIG. 4 illustrates voltages in the HVAC system 100 of FIG. 1. The top graph of FIG. 4 shows the DC voltage supplied to blower drive 115 during startup, normal operation, and a short circuit. As seen in FIG. 4, during startup, the DC voltage increases until it reaches a steady state operating voltage. When a short circuit occurs, the DC voltage suddenly drops to zero or near zero.

The bottom chart of FIG. 4 shows the voltage supplied to processor 125 of blower 115 during startup, normal operation, and a short circuit. As seen in FIG. 4, the voltage to processor 125 increases during startup until it reaches a steady operating voltage. When the short circuit occurs, the voltage supplied to processor 125 gradually decreases to zero or near zero. This gradual decline in voltage is a result of using capacitor 305 to supply electrical power to processor 125 during a short circuit. As a result, even though the DC voltage in the system suddenly drops to near zero during a short circuit, the voltage being supplied to processor 125 does not suddenly drop to zero. In this manner, processor 125 is provided enough time to record or log information about the system and the short circuit before shutting down.

Figure 5:
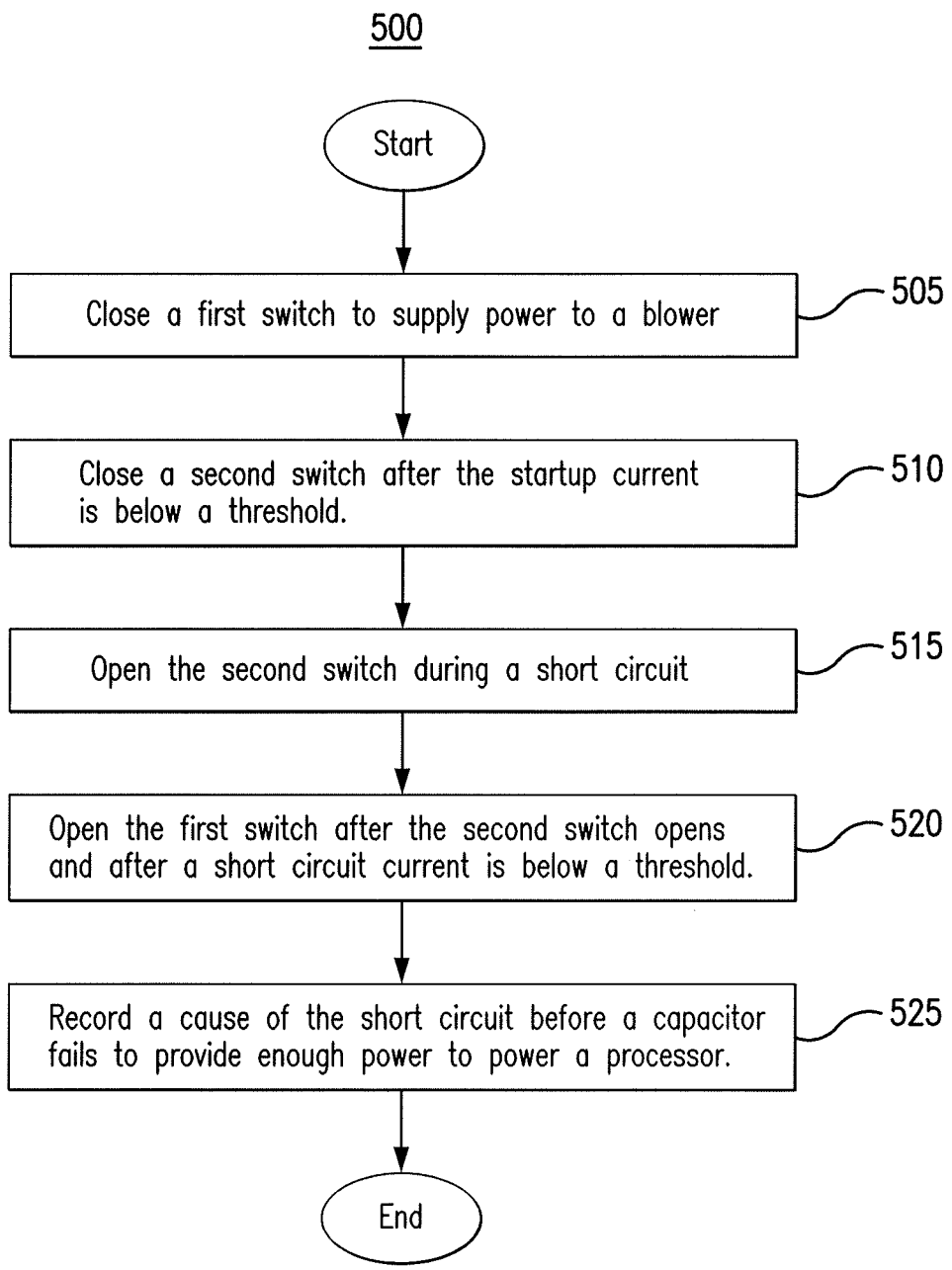
FIG. 5 is a flowchart illustrating a method for protecting the blower in the HVAC system of FIG. 1.

FIG. 5 is a flowchart illustrating a method 500 for protecting the blower in the HVAC system 100 of FIG. 1. In particular embodiments, components of system 100, such as protection circuit 105 and processor 125, perform method 500. By performing method 500, the HVAC system 100 is protected against short circuit currents and sudden current spikes.

In step 505, a first switch of protection circuit 105 closes to supply power to a blower. In step 510, a second switch of protection circuit 105 closes after the start up current falls below a threshold. Then, during a short circuit, the second switch opens in step 515. In step 520, the first switch opens after the second switch opens and after a short circuit current is below a threshold. In step 525, the processor 125 records a cause of the short circuit before a capacitor fails to provide enough power to power the processor.

Modifications, additions, or omissions may be made to method 500 depicted in FIG. 5. Method 500 may include more, fewer, or other steps. For example, steps may be performed in parallel or in any suitable order. While discussed as system 100 (or components thereof) performing the steps, any suitable component of system 100 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a blower drive comprising:
      a processor; and
      a capacitor electrically coupled to the processor, the capacitor configured to provide electrical power to the processor during a short circuit in the blower drive; and
   a protection circuit electrically coupled to the blower drive, the protection circuit comprising:
      a first switch;
      a positive temperature coefficient resistor electrically coupled in series to the first switch; and
      a second switch electrically coupled in parallel to the positive temperature coefficient resistor, the second switch configured to open during the short circuit in the blower drive, the first switch configured to open after the second switch opens and after a short circuit current is below a threshold, wherein the processor is configured to, during the short circuit, record a cause of the short circuit before the capacitor fails to provide enough electrical power to power the processor.

2. The apparatus of claim 1, further comprising an electromagnetic interference filter electrically coupled to the first switch.

3. The apparatus of claim 1, further comprising a rectifier electrically coupled to the positive temperature coefficient resistor, the second switch, and the processor.

4. The apparatus of claim 1, wherein the second switch is further electrically coupled in parallel to the first switch.

5. The apparatus of claim 1, wherein the first switch is configured to close to power the blower drive.

6. The apparatus of claim 5, wherein the second switch is configured to close after a startup current of the blower drive is below a threshold.

7. A method comprising:
   providing electrical to a blower through a first switch and a second switch;
   detecting a short circuit in the blower;
   in response to detecting the short circuit:
      opening the second switch;
      opening the first switch after the second switch opens and after a short circuit current is below a threshold;
      providing, through a capacitor, electrical power to a processor of the blower during the short circuit; and
      recording, during the short circuit, a cause of the short circuit before the capacitor fails to provide enough electrical power to power the processor.

8. The method of claim 7, wherein an electromagnetic interference filter electrically is coupled to the first switch.

9. The method of claim 7, wherein:
   a positive temperature coefficient resistor is electrically coupled in series to the first switch; and
   a rectifier is electrically coupled to the positive temperature coefficient resistor, the second switch, and the processor.

10. The method of claim 7, wherein the second switch is further electrically coupled in parallel to the first switch.

11. The method of claim 7, further comprising closing the first switch to power the blower.

12. The method of claim 11, further comprising closing the second switch after a startup current of the blower is below a threshold.

13. An HVAC system comprising:
   a blower configured to move air, the blower comprising:
      a processor; and
      a capacitor electrically coupled to the processor, the capacitor configured to provide electrical power to the processor during a short circuit in the blower; and
   a protection circuit electrically coupled to the blower, the protection circuit comprising:
      a first switch;
      a positive temperature coefficient resistor electrically coupled in series to the first switch; and
      a second switch electrically coupled in parallel to the positive temperature coefficient resistor, the second switch configured to open during the short circuit in the blower, the first switch configured to open after the second switch opens and after a short circuit current is below a threshold, wherein the processor is configured to, during the short circuit, record a cause of the short circuit before the capacitor fails to provide enough electrical power to power the processor.

14. The HVAC system of claim 13, further comprising an electromagnetic interference filter electrically coupled to the first switch.

15. The HVAC system of claim 13, further comprising a rectifier electrically coupled to the positive temperature coefficient resistor, the second switch, and the processor.

16. The HVAC system of claim 13, wherein the second switch is further electrically coupled in parallel to the first switch.

17. The HVAC system of claim 13, wherein the first switch is configured to close to power the blower.

18. The HVAC system of claim 17, wherein the second switch is configured to close after a startup current of the blower is below a threshold.

* * * * *